United States Patent [19]

Paavonen

[11] Patent Number: 5,634,197

[45] Date of Patent: May 27, 1997

[54] METHOD, MOBILE EXCHANGE, AND SUBSCRIBER STATION IN A MOBILE RADIO SYSTEM FOR ESTABLISHING A HIGH-PRIORITY CALL

[75] Inventor: Tapio Paavonen, Saarijärvi, Finland

[73] Assignee: Nokia Telecommunications OY, Espoo, Finland

[21] Appl. No.: 416,731

[22] PCT Filed: Aug. 11, 1994

[86] PCT No.: PCT/FI94/00348

§ 371 Date: Apr. 12, 1995

§ 102(e) Date: Apr. 12, 1995

[87] PCT Pub. No.: WO95/05721

PCT Pub. Date: Feb. 23, 1995

[30] Foreign Application Priority Data

Aug. 12, 1993 [FI] Finland ................... 933576

[51] Int. Cl.⁶ ........................... H04B 1/00
[52] U.S. Cl. ........................... 455/58.1; 455/34.1
[58] Field of Search ................ 455/34.1, 53.1, 455/54.1, 54.2, 56.1, 58.1, 58.2, 33.1

[56] References Cited

U.S. PATENT DOCUMENTS

| 5,465,391 | 11/1995 | Toyryla | 455/33.4 |
| 5,471,646 | 11/1995 | Schultz | 455/54.1 |
| 5,530,916 | 6/1996 | Schultz | 455/54.1 |

FOREIGN PATENT DOCUMENTS

| 3334886 | 8/1992 | Germany . |
| 9305622 | 3/1993 | WIPO . |

OTHER PUBLICATIONS

Patent Abstract of Japan, vol. 15, No. 195, E–1069, Abstract of JP, A, 3–50996 (Iwatsu Electric Co. Ltd.) 5 Mar. 1991.

Patent Abstracts of Japan, vol. 13, No. 366, E–806, Abstract of JP, A, 1–122244 (Hitachi Ltd.), 15 May 1989.

*Primary Examiner*—Reinhard J. Eisenzopf
*Assistant Examiner*—Darnell R. Armstrong
*Attorney, Agent, or Firm*—Cushman Darby & Cushman IP Group of Pillsbury Madison & Sutro LLP

[57] ABSTRACT

A method, mobile exchange, and subscriber station for establishing a high-priority individual call or group call to at least one subscriber (MS1–MS4) in a mobile radio system participating in a first group call conducted on a given channel. To establish a high-priority call on said channel, a release message provided with an identifier of the subscriber (MS4) participating in the first group call to whom it is desired to establish a high-priority individual call or high-priority group call and/or an identifier of the high-priority individual call or high-priority group call to be established is sent (405) on said channel to all subscribers (MS1–MS4) engaged in the first group call; the subscribers (MS1–MS4) engaged in the first group call receive said release message; said subscriber (MS4) to whom it is desired to establish a high-priority individual call or high-priority group call detects (503, 507) on the basis of said identifier included in the release message received that the release message is intended for said subscriber (MS4); said subscriber (MS4) terminates (506) his engagement in the group call; said subscriber (MS4) joins said high-priority call on the basis of the high-priority call identifier received.

13 Claims, 4 Drawing Sheets

5,634,197

METHOD, MOBILE EXCHANGE, AND SUBSCRIBER STATION IN A MOBILE RADIO SYSTEM FOR ESTABLISHING A HIGH-PRIORITY CALL

FIELD OF THE INVENTION

The invention relates to a method for establishing a high-priority individual call or group call to at least one subscriber in a mobile radio system participating in a first group call conducted on a given channel.

The method of the invention is specifically designed for use in what are known as trunked networks, which are typically company networks or government networks in which all channels are shared by one or several companies or governmental agencies. In such networks the subscribers have individual subscriber numbers and also group numbers indicating the group call group or subscriber group the subscriber belongs to, thus enabling calls intended for members of a given group to be switched to subscribers of said group.

The invention is suitable to be used in mobile radio systems with digital as well as analog radio paths. Analog mobile radio systems have been described for example in MPT 1327, January 1988, revised and reprinted November 1991, *A Signalling Standard for Trunked Private Land Mobile Radio Systems*, and MPT 1343, January 1988, revised and reprinted September 1991, *Performance Specification*, United Kingdom Department of Trade and Industry, Radiocommunications Agency.

BACKGROUND OF THE INVENTION

In public mobile radio networks, such as the NMT (Nordic Mobile Telephone) system, all calls have the same priority, i.e. none of the users have rights taking precedence over the rights of other users.

In private radio networks, some of which implement the trunked method, the situation is different. In such PMR (Private Mobile Radio) networks, it is possible to control the operation of the network in such a way that users carrying out specific tasks, e.g. emergency servicing or other urgent work, have a higher priority, i.e. their high-priority calls are the first to be switched in a heavily loaded traffic situation. It is even possible to define so high a priority that an existing call is cleared down before the new call if the new call cannot otherwise be switched. In most cases, the reason for switching being prevented is the fact that all radio channels are occupied, or the fact that the called subscriber is already engaged in a call. Other resources may also in fact be occupied and prevent switching of the call.

Where two-party calls are in progress in a mobile radio system, the system—for example its mobile exchange or a database in the mobile exchange—is aware of which radio units participate in the call. On this basis, when a high-priority call is to be established to a subscriber engaged in a call, the mobile exchange can terminate the ongoing call to disengage the subscriber to whom a new call is to be established. In a group call the situation is more difficult, as the mobile exchange in the mobile radio system is not necessarily aware of which group calls given subscribers belong to, and thus the mobile exchange is not aware of which radio channel said subscribers are listening to.

A group call is a call in which the system commands several, at least three, subscribers to the same call with a single command. The groups are formed of members of a company or other user organization, and often the groups are programmed into the mobile radio and the mobile exchange is not necessarily aware of which mobile radios belong to each group. Typically one mobile radio may belong to several groups. Part of the group numbers may even be such that they may be changed very often, if necessary every morning, and an indication of these changes is not necessarily sent to the mobile exchange. For example the MPT 1327 and MPT 1343 standards do not provide for means for communicating the group numbers from the mobile radios, i.e. subscriber stations, to the mobile exchange. This makes it especially difficult to include a subscriber who is already engaged in a previously initiated group call in a high-priority call. This situation is very common in mobile radio networks, as very often specifically those subscribers who are wanted in high-priority calls already participate in prior group calls on account of the fact that said subscribers have a vital function in their organizations.

The above problem has been resolved in prior art solutions by clearing down all group calls within the area of the mobile radio system. By clearing down the group calls, the subscriber who is desired to be included in the high-priority call can in fact be found, but at the same time the initial, i.e. first, group call is terminated and it must be re-established without the party that has been included in the high-priority call. This procedure causes considerable disadvantage to other subscribers in the mobile radio system, as these must unduly interrupt their group call. When interrupted group calls are re-established, the mobile radio system is loaded by unnecessary connection establishment procedures. Furthermore, if the mobile radio system has a very high traffic level, the initial group call group may forfeit the radio channel it used, as another group call or another call may seize the channel while the first group call is interrupted and one of its subscribers is being searched for a high-priority individual call or group call.

A further drawback of the prior art solution is that if it is not desired to clear down the existing group call, the subscriber wanted for the high-priority call cannot be included in the new call to be established at all. Thus the subscriber has poor availability.

DESCRIPTION OF THE INVENTION

It is an object of the present invention to provide a method for establishing a high-priority individual call or group call to a subscriber participating in a first group call conducted on a given channel which avoids the problems involved in the solutions according to the prior art. The object is to be able to release a subscriber engaged in a group call to participate in a high-priority call without the problems entailed by the solution according to the prior art. It is another object of the present invention to enable inclusion of a given subscriber in a given high-priority call. It is a further object to realize a method for establishing a high-priority individual call or group call, according to which method as one or more subscribers engaged in a group call leave the group call, the subscribers remaining with the initial group call are given the opportunity to become aware that one or more identified subscribers are leaving or have left said call.

This novel method for establishing a high-priority individual call or group call to at least one subscriber in a mobile radio system participating in a first group call conducted on a given channel is achieved with the method of the invention, which is characterized in that a release message provided with an identifier of the subscriber participating in the first group call to whom it is desired to establish a high-priority individual call or high-priority group call and/ or an identifier of the high-priority individual call or high-priority group call to be established is sent on said channel to all subscribers engaged in the first group call; the subscribers engaged in the first group call receive said release message; said subscriber to whom it is desired to establish a high-priority individual call or high-priority group call detects on the basis of said identifier included in the release message that the release message is intended for said subscriber; said subscriber terminates his engagement in the group call; said subscriber joins said high-priority call on the basis of the high-priority call identifier received.

The present invention further relates to a mobile exchange comprising a switching matrix, an interface unit, a controller, and memory means for storing subscriber identifiers and group call identifiers. The mobile exchange of the invention is characterized in that it comprises means for sending a release message provided with an identifier of the subscriber participating in the first group call to whom it is desired to establish a high-priority individual call or high-priority group call and/or an identifier of the high-priority individual call or high-priority group call to be established, to all subscribers engaged in the first group call.

The invention further relates to a subscriber station in a mobile radio system, comprising a memory for storing identifiers of group calls allowed for the subscriber station, a transceiver, a handset, a control unit for controlling the operation of the subscriber station in response to commands from the handset and the system controller. The subscriber station in a mobile radio system in accordance with the invention is characterized in that the subscriber station further comprises means for receiving a release message and for comparing the identifier of the high-priority individual call or high-priority group call to be established, included in the release message, with the identifier of the subscriber station and/or with a group call identifier stored in the memory of the subscriber station as an identifier of an allowed group call, means responsive to such comparison for releasing the subscriber station from the first group call and for transferring the subscriber station to a high-priority individual call or high-priority group call to be established.

The invention is based on the idea that a subscribed engaged in a group call can be released for a high-priority call by sending a release message on the channels for all group calls either to said subscriber if an individual call is to be established, or to a group if a group call is to be established. The mobile radio must be capable of processing the release message that has arrived in such a way that the mobile leaves the group call. The other subscribers can remain with the group call unless the channel must be seized for the call to be established. In that case, the given subscriber or subscribers are released from the ongoing group calls. This is naturally only the case when said subscribers are within the service area of the mobile radio system. If they are not within its service area, receipt of the release message has no significance, since outside the service area the subscribers would not be able to hear the call to enter the new call either. If the traffic channel that is used is to be cleared for a new call, the release message is sent using the same call identifier by means of which the group call was established, since all subscribers must leave said group call.

It is an advantage of such a method, mobile exchange, and subscriber station in a mobile radio system for establishing a high-priority individual call or high-priority group call that the method, mobile exchange and subscriber station of the invention improve the accessibility of a subscriber engaged in a group call when such a subscriber is wanted in a high-priority call and when it is not necessarily desired to clear down the group call in which said subscriber is engaged.

A further advantage of the invention is that it is not necessary to clear down the group call entirely when it is desired to establish a high-priority call to one subscriber participating in the group call, as in the prior art solution. Thus the other subscribers participating in said group call are not unduly excluded from the group call but can continue the group call without disruption, even though one or more subscribers engaged in the group call transfer to a high-priority group call.

This entails a further advantage of the invention, as it avoids establishment of a new group call to those subscribers participating in the group call who have not been called to enter a new high-priority call.

The fact that the earlier group call need not be cleared down entails the advantage that connection establishment messages necessary for establishing a new group call, which would load the mobile radio system, need not be sent in the system.

Still another advantage of the invention is that since the earlier group call is not cleared down, the risk of the channel for the earlier group call being allocated for the needs of another call while the group call is interrupted is avoided.

BRIEF DESCRIPTION OF THE DRAWINGS

In the following the invention will be explained in greater detail with reference to the accompanying drawings, in which.

DETAILED DESCRIPTION OF THE INVENTION

Figure 1:
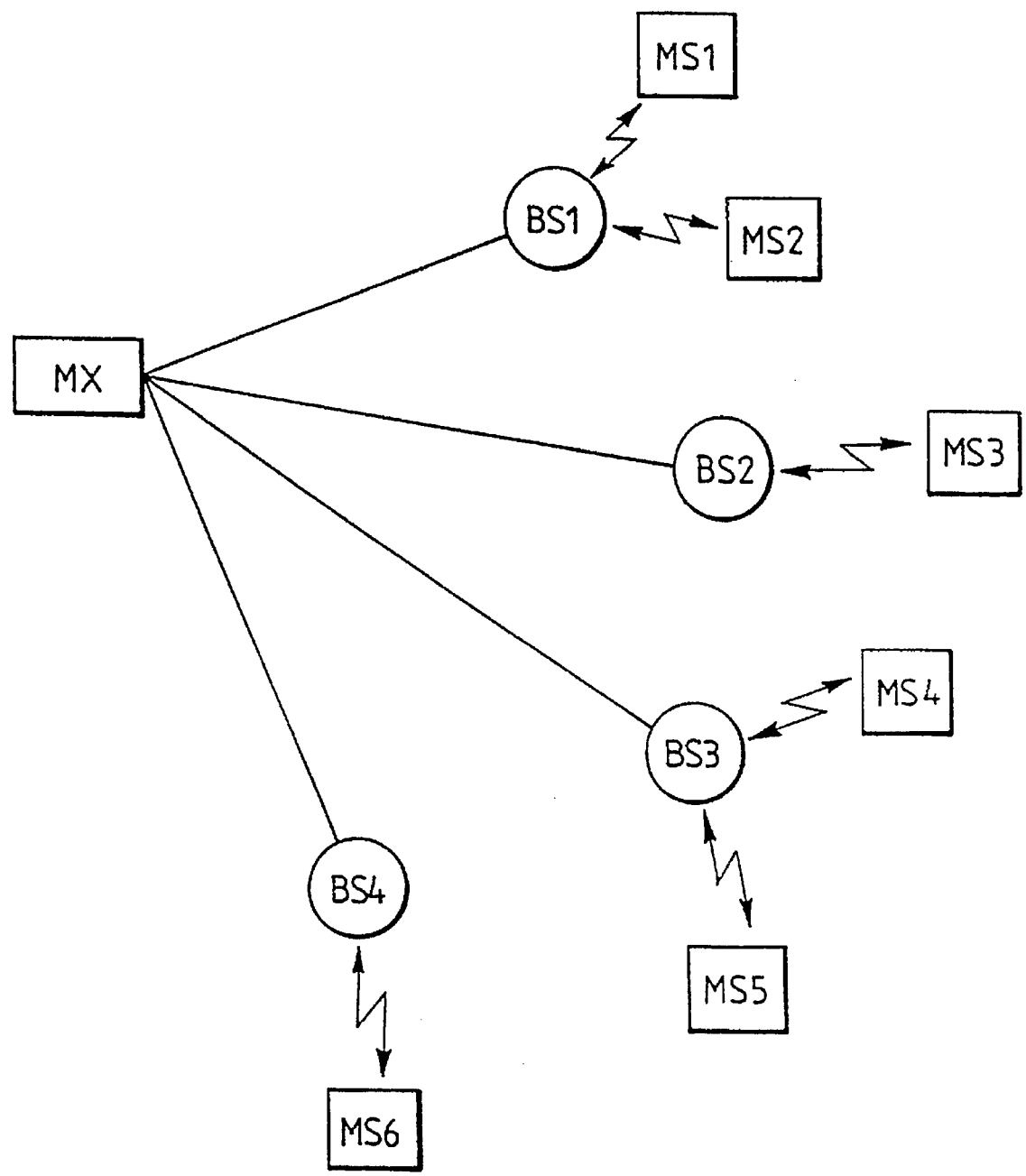
FIG. 1 is a schematic view of subscriber stations in a group call.

FIG. 1 is a schematic view of subscriber stations in a group call. The schematic view shows a mobile exchange MX to which base stations BS1–BS4 are connected by means of telecommunication connections. The figure also shows subscribers MS1–MS6 located within the service area of the mobile exchange, accessing via radio paths to base stations BS1–BS4. The subscriber stations, mobile radios MS1–MS4 participate in a first (former) group call by listening to the channel for said group call. Presently the mobile exchange receives information on the fact that mobile station MS4 is wanted in another call having high priority, which may be a normal two-party call MS4–MS5 or a group call between several subscribers MS4, MS5, MS6. In that situation, the mobile exchange MX sends a release message to subscriber stations MS1–MS4 on the channels for all group calls. The release message may be, in trunked systems for example, a normal release message MAINT (clear) to be sent on a traffic channel. This message is detailed in the MPT 1327 and MPT 1343 specifications. The invention, however, comprises the novel feature distinct from the MPT 1327 and MPT 1343 specifications that during a group call, release messages are sent that are not related to that particular group call but to new calls to be established. The call control processor at the mobile exchange makes the decision regarding the sending of a release message, and the call control processor is also in charge of the new call to be established. The subscriber station MS4, which is wanted in a high-priority call instead of the group call, detects from the release message that he is wanted in the new high-priority call. Thereupon said subscriber MS4 terminates his participation in the "old" group call and starts listening to the channel for the new group call or initiates a new call with another subscriber station MS5.

It is to be noted that the mobile radio system may have simultaneously several group calls established, and release messages commanding the given subscribers to terminate their participation in said group calls and to enter new calls of high or higher priority, which may be new group calls or new two-party calls, can be sent to all subscriber stations participating in the previous calls on the channels for such group calls.

The release message must be sent to subscribers in all currently established group calls, as it is not known which group call said subscriber participates in or whether the given (sought) subscriber is engaged in any ongoing group call. Sending of the release message induces slight deterioration in voice quality, which can be compensated for almost entirely by present-day techniques.

Figure 2:
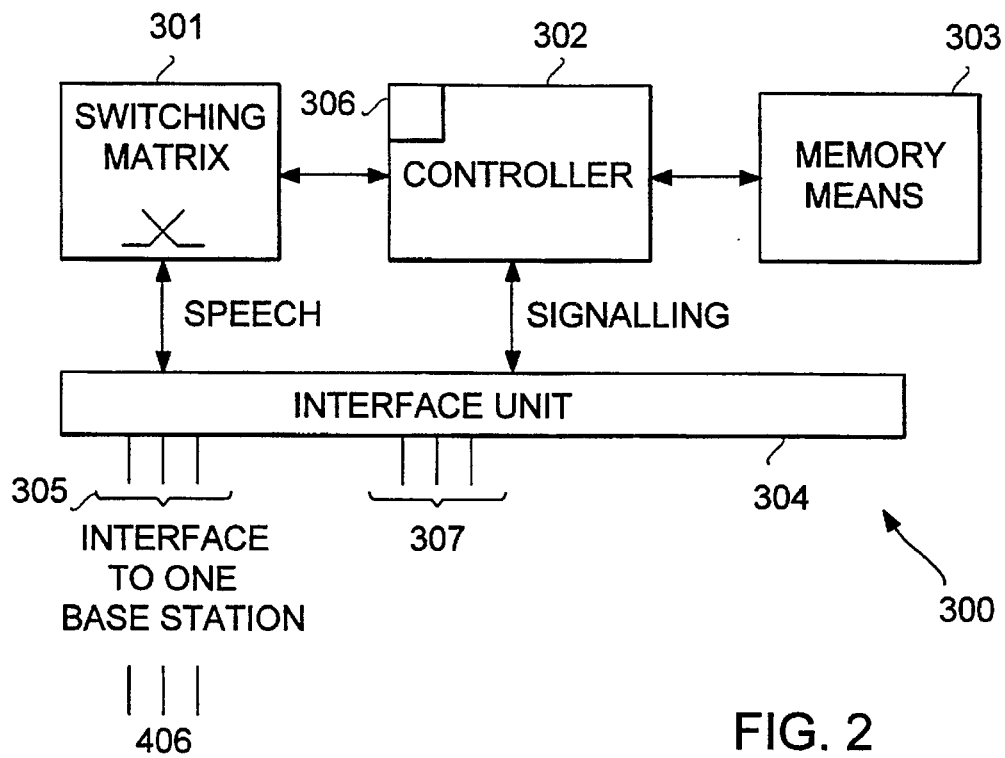
FIG. 2 is a block diagram of a mobile exchange of the invention for a mobile radio system.

FIG. 2 is a block diagram of a mobile exchange 300 of the invention for a mobile radio system. It is the task of interface unit 304 to offer interfaces 305 for base stations BS1, BS2, BS3, BS4 for voice and signalling traffic. There may also be other interfaces, such as interfaces to a public switched telephone network, PABXs and other exchanges 307. A switching matrix 301 and a controller 302 are connected to the interface unit 304, for example by way of a data bus.

It is the task of the switching matrix 301 to switch speech paths between the various subscriber units call-specifically. In a two-party call, the speech paths of two subscriber units are interconnected. In a group call, all subscriber stations MS1, MS2, MS3, MS4, MS5, MS6 belonging to the call are interconnected, for example in a conference-type connection.

The controller 302 attends e.g. to the set-up and clearing down of calls. For this purpose, the controller is connected to the interface unit 304 by way of which it can send and receive signalling messages. The controller 302 is also connected to the switching matrix 301, which it controls call-specifically. In the mobile exchange 300 of the invention, means 306 are incorporated in the controller 302 for sending a release message to all subscribers MS1, MS2, MS3, MS4 participating in the first group call. Said means 306 may send the release message to participants in other group calls as well. The release message may be provided with an identifier identifying a subscriber M4 participating in the first group call, to whom it is desired to establish a high-priority individual call or high-priority group call. The release message may be further provided with an identifier identifying the high-priority individual call or high-priority group call to be established. The subscriber station compares the identifier included in the release message with its own identifier, and if the identifier of the release message and that of the subscriber station are the same, the subscriber station terminates its participation in the group call and returns to the control channel, whereafter the subscriber station Joins the given high-priority call. The subscriber station performs a similar comparison, and if the release message contains any of the group numbers of the subscriber, the subscriber station terminates its participation in the earlier group call and Joins the high-priority group call.

The controller 302 also comprises memory means 303. This memory means 303 may be either incorporated in the controller 302, incorporated in the entire mobile exchange, or implemented as a separate memory means. All information necessary for the operation of the mobile radio system is stored in the memory means 303. This information may include information related to the subscriber stations MS1, MS2, MS3, MS4, MS5, MS6, for example information on subscribers entitled to communicate in the system, information on the functions allowed for each subscriber station MS1, MS2, MS3, MS4, MS5, MS6, information on the location of the subscriber stations, for example with an accuracy of one base station or location area, and information on the ongoing calls.

Figure 3:
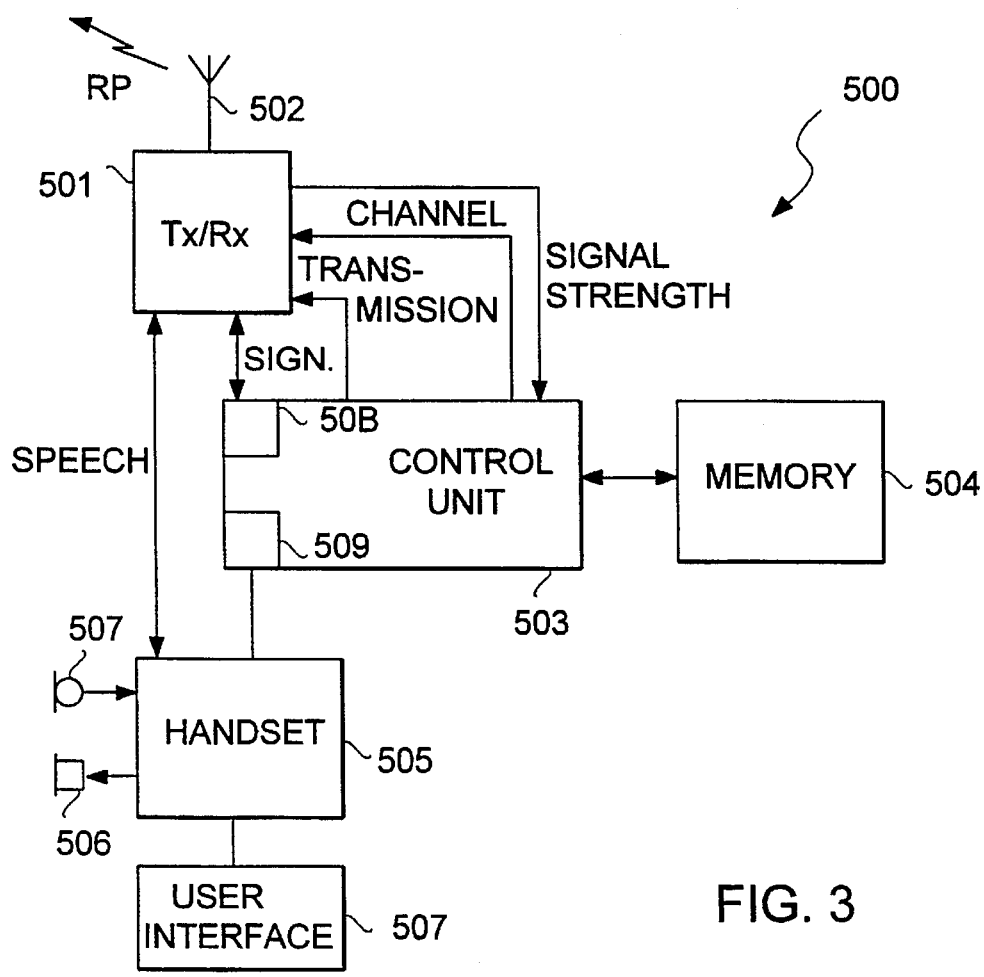
FIG. 3 is a block diagram of a subscriber station of the invention for a mobile radio system.

FIG. 3 illustrates a typical subscriber station, i.e. the configuration of a mobile radio used by a subscriber. It is the task of transceiver (TX/RX) 501 to tune to the radio channel employed in each case. The transceiver incorporates an antenna 502 connected to a radio path RP. Normally radio frequencies in the range 60–1000 MHz (VHF and UHF ranges) are employed, although other frequencies may be used as well. Analog modulation may be used in the radio path RP, the mode of modulation normally being phase modulation. Also other modes of modulation may be used. A voice-frequency subcarrier (FFSK), for example, may be used for signal transmission. The radio path may also be conveyed digitally.

The handset 505 comprises electroacoustic transducer means, typically an earphone 506 and a microphone 509, and possibly push buttons in the user interface 507 for the initiation and termination of the call as well as selection. Since in a trunked system speech in the radio path RP is preferably alternate, the handset normally also has a press-to-talk (PTT) switch which must be pressed during the speaking turn.

It is the task of the control unit 503 to control the function of the subscriber station. The control unit 503 has access to the handset 505 wherefrom it obtains the impulses for the initiation and termination of a call, for instance. The control unit 503 may also give to the user an audio signal or a visual signal related to the mobile radio and/or the mobile radio system through the handset 505 or user interface 507.

The control unit 503 is connected to the transceiver TX/RX 501. The channel used by the transceiver is determined by the control unit 503, in other words, the transceiver 501 tunes to the channel (radio frequency) determined by the control unit 503. The transceiver 501 is also switched on under the control of the control unit 503. The control unit 503 receives and sends signalling messages through the transceiver 501. The control unit may also receive an indication of the signal strength of the received signal.

The control unit 503 also incorporates a memory 504, storing permanent data and volatile data. Such permanent data includes the individual number of a subscriber station, numbers of the group call groups in which the subscriber station is allowed to participate, i.e. the identifiers of the group calls allowed for the subscriber station, and radio channels belonging to the system. Said volatile data includes the momentary status of the subscriber station, e.g. idle state, call setup state, in-call state, etc., and for example information on which channel the subscriber station is tuned to.

The subscriber station 500 according to the invention further comprises means 508 for receiving a release message sent by the mobile exchange 300 and for comparing the identifier included in the release message with the identifier of the subscriber station and/or a group call identifier recorded as an identifier for an allowed group call in the memory 504 of the subscriber station. The release message sent by the mobile exchange includes the identifier of the high-priority individual call or high-priority group call, which the subscriber station compares with its own identifier stored in the memory or with the identifier of an allowed group call. After the comparison, means 509 responsive to said comparison release the subscriber station from the first group call and connect the subscriber station with the high-priority individual call or group call to be established, if the result of the comparison is positive, i.e. the identifier included in the release message is the same as the identifier stored in the memory of the subscriber station.

Figure 4:
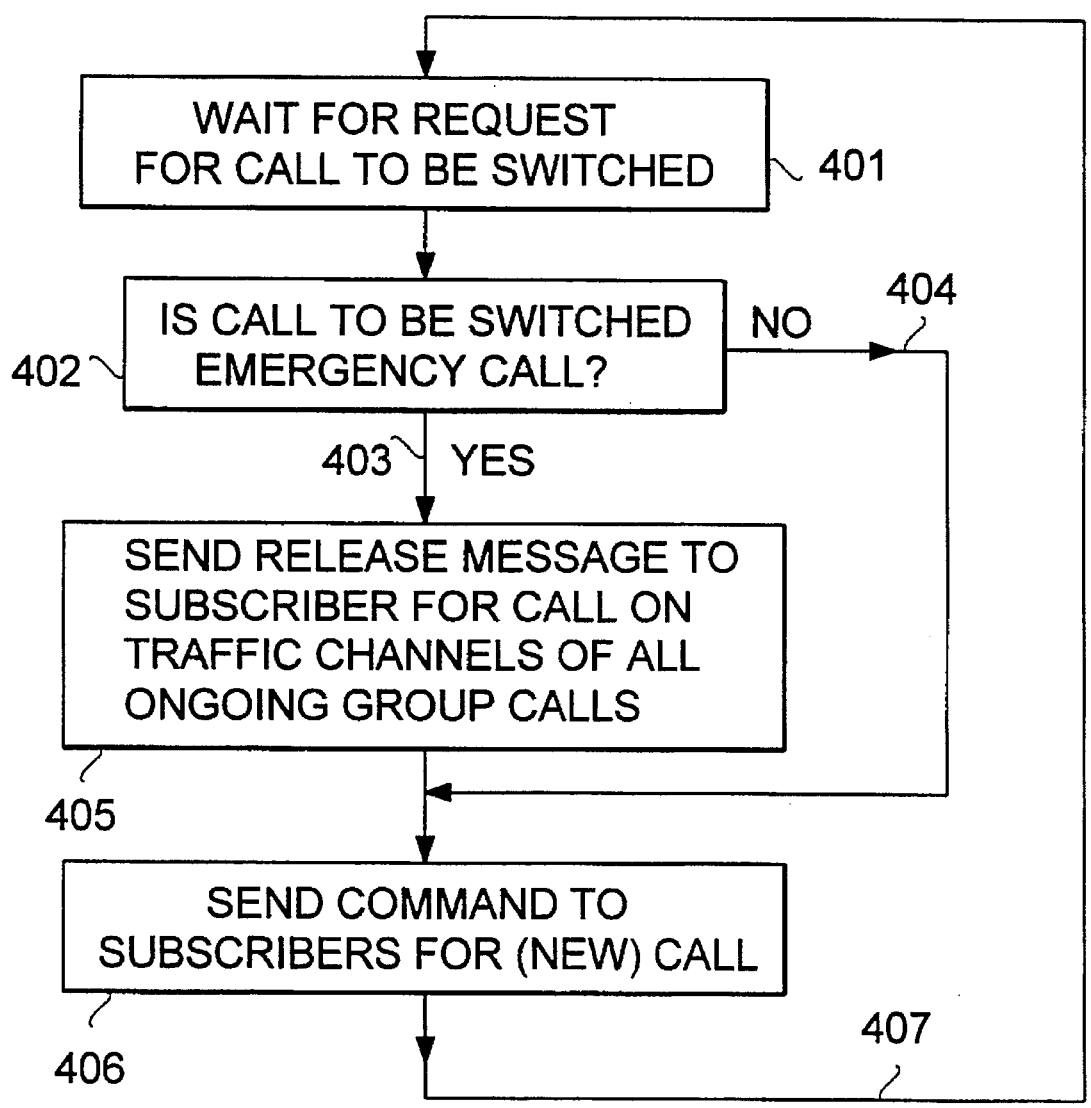
FIG. 4 is a flow chart of the operation of the mobile exchange of the invention.

FIG. 4 is a flow chart of the operation of the mobile exchange of the invention. The figure illustrates how a subscriber engaged in a group call is commanded to enter an emergency call, i.e. a highly priorized call. The description of FIG. 4 herein is from the point of view of the mobile exchange 300 or system controller of the mobile radio system. Initially, the mobile exchange or its system controller awaits 401 a request for a call to be switched. The mobile exchange checks 402 whether the call to be switched is an emergency call or other high-priority call. If the inbound call is of a high priority, the mobile exchange sends 405 a release message to subscribers wanted in said call on the traffic channels of all ongoing group calls. Thereafter, and also if the call to be connected does not have 404 a high priority, i.e. is not an emergency call, the mobile exchange sends a command 406 to the given subscriber for the new call on the control channel, whereafter the mobile exchange returns to await switching of the new call to step 401.

Figure 5:
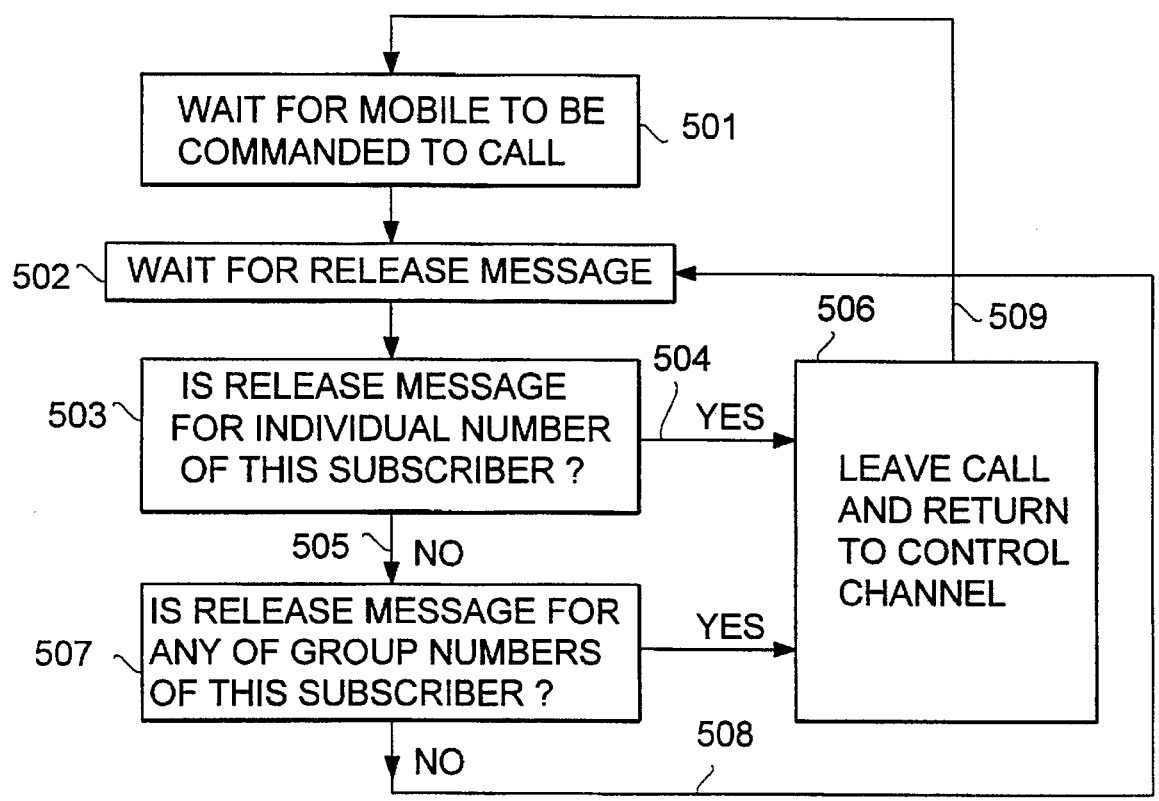
FIG. 5 is a flow chart of the operation of the subscriber station of the invention.

FIG. 5 is a flow chart of the operation of the subscriber station 500 of the invention. The figure shows how a subscriber engaged in a group call is commanded to enter an emergency call, i.e. a highly priorized call. The description here is from the point of view of the subscriber station, i.e. the subscriber unit (mobile radio). The subscriber station awaits 701 to be commanded to the call. When the subscriber station has been commanded to the call, typically a group call, the subscriber station awaits 702 a release message sent by the mobile exchange. Upon receipt of a release message, the subscriber station checks 703 whether the release message is for its subscriber number or individual number. If the release message includes 704 the subscriber number of said subscriber station, the subscriber station leaves the group call in which it has participated and returns to the control channel. If, on the other hand, the release message does not include 705 the subscriber number of said subscriber station, the subscriber station checks whether the release message is intended for any of the group numbers of the given subscriber, in other words, the subscriber station performs a comparison as to whether the group call identifier included in the release message is the same as the identifier of any allowed group call stored in the memory of said subscriber station. If this is the case, the operation proceeds with step 706, as set out above. If, on the other hand, the release message does not include 708 identifiers of the group numbers of the subscriber station, the subscriber station moves to await a new release message 702.

Figure 6:
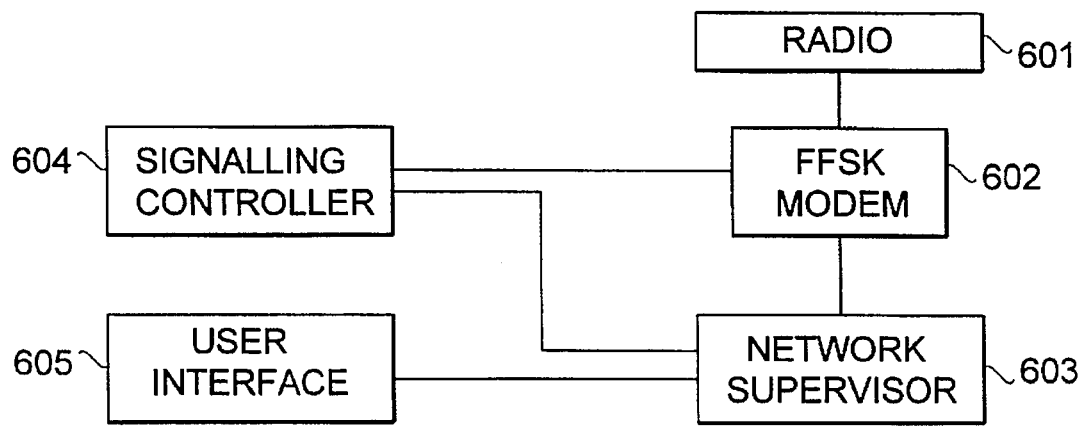
FIG. 6 is a block diagram of an embodiment of the subscriber station of the invention.

FIG. 6 is a block diagram of an embodiment of the subscriber station of the invention. The signalling controller 604 of the subscriber station interprets the incoming messages from the radio path, and respectively generates the outgoing messages and the necessary acknowledgement messages. The signalling controller 604 further receives incoming release messages and checks whether they are intended for a given subscriber, either to his individual number or to any of his group numbers. A network supervisor 603 maintains contact with the mobile radio system. A FFSK modem 602 generates from the messages arriving from the signalling controller an audio signal for the radio 601, said signal modulating the RF-frequency (80 MHz, 160 MHz or 450 MHz) carrier of the radio. User interface 605 is the interface between a terminal and the user.

The invention further comprises a method for speeding call establishment for a call to be set up. In the method, a release message by which a subscriber is released from the previous call may include information in response to which the subscriber immediately moves to a new channel. In that case, the release message is a message causing the subscriber immediately to move to listen to a new radio channel.

In implementing the inventive method for establishing a priority call as outlined above, a situation may arise where one or several subscribers leave a lower-priority call for a higher-priority call. In such a situation, the other subscribers belonging to the initial group call do not become aware of the fact that said one or more subscribers have left the call, but assume that they are still engaged in the call and attempt to communicate with them.

A way to solve the above problem is to clear down all calls in which participants for the new call to be established are engaged. This step is naturally too extreme and also unnecessary, as it brings disadvantage of the kind set out in connection with the description of preceding drawbacks of invention.

Another way to solve the above problem is to use a call waiting function implemented to the participants for the new call to be established before they are released from the initial call. In that case, when the subscribers to be transferred to the new call are signalled, by using a call waiting function, that they are about to be transferred to a new call, they can inform the subscribers remaining with the initial call orally on the group call channel that they will transfer to communicate on a new channel. The above solution is not suitable for emergency calls or other high-priority calls, since it requires a slow user-originated operation from several subscribers who possibly attempt to perform it almost simultaneously, and thus the initial channel is unnecessarily loaded and passing of information is further slowed down.

Therefore, in operating according to an additional embodiment of the invention, the release message to be sent in accordance with the invention includes information by means of which the subscriber or subscribers to be released from the initial call are informed that they will move to another call. Furthermore, also the subscribers remaining with the initial call can be informed, by means of said release message, about the subscribers that transfer to the new call. Thus in the additional embodiment of the invention, the release message includes information in response to which the subscriber MS4 is informed that he will be transferred to a given high-priority individual call or high-priority group call. The release message may further include information in response to which the subscribers remaining with the initial call or group call are informed that the subscriber who is wanted in a high-priority individual call or a high-priority group call will be transferred to said high-priority individual call or high-priority group call.

The drawings and the description referring to them are only intended to illustrate the idea of the invention. The method, mobile exchange, and subscriber station in a mobile radio system for establishing a high-priority individual call or high-priority group call in accordance with the invention may vary in their details within the scope of the claims. Even though the invention has been set forth in the above primarily in the context of trunked systems, it may be implemented in other kinds of radio telephone and mobile telephone systems as well.

I claim:

1. A method for establishing a high-priority individual call or group call to at least one subscriber in a mobile radio system participating in a first group call conducted on a given channel, the method comprising the steps of:

sending a release message provided with an identifier of the subscriber participating in the first group call to whom it is desired to establish a high-priority individual call or high-priority group call and/or an identifier of the high-priority individual call or high-priority group call to be established on said channel to all subscribers engaged in the first group call, receiving by the subscribers engaged in the first group call of said release message, detecting by said subscriber to whom it is desired to establish a high-priority individual call or high-priority group call, on the basis of said identifier included in the release message, that the release message is intended for said subscriber, terminating by said subscriber of said subscriber's engagement in the group call, and joining by said subscriber of said high-priority call on the basis of the high-priority call identifier received.

2. A method as claimed in claim 1, wherein the release message is sent to all subscribers participating in ongoing group calls in the mobile radio system.

3. A method as claimed in claim 1, wherein the release message includes information in response to which the subscriber that has received the release message immediately moves to listening to the channel for the call to be established.

4. A method as claimed in claim 2, wherein the release message includes information in response to which the subscriber that has received the release message immediately moves to listening to the channel for the call to be established.

5. A method as claimed in claim 1, wherein the release message includes information in response to which the subscriber is informed that the subscriber will be transferred to said high-priority individual call or said high-priority group call.

6. A method as claimed in claim 2, wherein the release message includes information in response to which the subscriber is informed that the subscriber will be transferred to said high-priority individual call or said high-priority group call.

7. A method as claimed in claim 3, wherein the release message includes information in response to which the subscriber is informed that the subscriber will be transferred to said high-priority individual call or said high-priority group call.

8. A method as claimed in claim 4, wherein the release message includes information in response to which the subscriber is informed that the subscriber will be transferred to said high-priority individual call or said high-priority group call.

9. A method as claimed in claim 1, wherein the release message includes information in response to which the subscribers remaining with the initial group call are informed that the subscriber to whom it is desired to establish a high-priority individual call or high-priority group call will be transferred to said high-priority individual call or high-priority group call.

10. A method as claimed in claim 2, wherein the release message includes information in response to which the subscribers remaining with the initial group call are informed that the subscriber to whom it is desired to establish a high-priority individual call or high-priority group call will be transferred to said high-priority individual call or high-priority group call.

11. A method as claimed in claim 3, wherein the release message includes information in response to which the subscribers remaining with the initial group call are informed that the subscriber to whom it is desired to establish a high-priority individual call or high-priority group call will be transferred to said high-priority individual call or high-priority group call.

12. A mobile radio system for establishing a high-priority individual call or group call to at least one subscriber in a mobile radio system participating in a first group call conducted on a given channel, the mobile radio system comprising:

a mobile exchange comprising:
a switching matrix;
an interface unit;
a controller;
a memory for storing subscriber identifiers and group call identifiers; and
sending means for sending a release message provided with an identifier of the subscriber participating in the first group call to whom it is desired to establish a high-priority individual call or high-priority group call and/or an identifier of a high-priority individual call or high-priority group call to be established, to all subscribers engaged in the first group call; and subscriber equipment of subscribers engaged in the first group call being arranged to receive said release message, wherein:

said subscriber equipment of said subscriber to whom it is desired to establish a high-priority individual call or high-priority group call being arranged to detect on the basis of said identifier included in the release message that the release message is intended for said subscriber;

said subscriber equipment of said subscriber being arranged in response to said detection to terminate the engagement of said subscriber in the group call; and said subscriber equipment of said subscriber being arranged to join said high-priority call on the basis of the high-priority call identifier received.

13. A subscriber station for a mobile radio system, comprising:

a memory for storing identifiers of group calls allowed for the subscriber station;

a transceiver;

a handset;

a control unit for controlling the operation of the subscriber station in response to commands from the handset and a system controller of the mobile radio system;

receiving means for receiving a release message containing an identifier of high-priority individual call or high-priority group call to be established, for comparing the identifier included in the release message, with the identifier of the subscriber station and/or with a group call identifier stored in the memory of the subscriber station as an identifier of an allowed group call, and for detecting on the basis of said identifier included in the release message that the release message is intended for said subscriber; and terminating means responsive to such comparison for terminating the engagement of the subscriber in the first group call and for releasing the subscriber station from the first group call and for transferring the subscriber station to a high-priority individual call or high-priority group call to be established.

* * * * *